United States Patent [19]

Egly et al.

[11] Patent Number: 5,078,358
[45] Date of Patent: Jan. 7, 1992

[54] COPY HOLDER

[75] Inventors: Robert A. Egly, 31 Belcourt South, Newport Beach, Calif. 92660; Patrick Sullivan, Orange, Calif.

[73] Assignee: Robert A. Egly, Newport Beach, Calif.

[21] Appl. No.: 583,169

[22] Filed: Sep. 14, 1990

[51] Int. Cl.⁵ .................................................. A47F 7/00
[52] U.S. Cl. .............................. 248/447.1; 248/454; 248/278; 248/316.3; 248/918; 211/89
[58] Field of Search ............ 298/683, 441.1, 442.2, 298/447, 447.1, 450, 451, 452, 454, 455, 458, 278, 291, 309.1, 316.3, 918, 316.2; 24/67 R; 400/718; 211/89, 45

[56] References Cited

U.S. PATENT DOCUMENTS

| 394,196 | 12/1988 | May | 248/454 |
|---|---|---|---|
| 2,377,488 | 6/1945 | Fugazzi | 211/45 |
| 3,814,368 | 6/1974 | Freed | 248/316.3 |
| 4,693,443 | 9/1987 | Drain | 248/918 |
| 4,902,078 | 2/1990 | Judd | 248/918 |
| 4,934,648 | 6/1990 | Yueh | 248/918 |

FOREIGN PATENT DOCUMENTS 3479 5/1988 PCT Int'l Appl. ................ 400/718

Primary Examiner—Ramon O. Ramirez
Assistant Examiner—Robert A. Olson
Attorney, Agent, or Firm—George F. Bethel; Patience K. Bethel

[57] ABSTRACT

A copy holder having a slotted beam sized to accommodate paper copy has locking means in the form of a cylindrical bearing held partially within the slot of the beam to provide weighted pressure against paper held within the slot. A paper back support is hinged to the slotted beam which is pivotally mounted to a support bracket which is slidably received in a mounting bracket secured to a monitor or other object.

10 Claims, 4 Drawing Sheets

COPY HOLDER

FIELD OF THE INVENTION

This invention relates to the field of copy holders and particularly to a copy holder which can be removably secured to a computer monitor.

DESCRIPTION OF THE PRIOR ART

The prior art with regard to copy holders has comprised a number of various designs. These have mainly comprised a rigid paper support member or backing of steel or plastic of a size corresponding to the paper sheet or copy to be held. The backing is usually provided with a spring loaded clip to hold smaller size cards and paper. The backing member for the paper sheet or copy is normally supported by a plate which is angularly attached to the back of the backing or paper support member to support the paper backing member in the manner of a picture frame.

These copy holders are useful but take up considerable room on a desk. With the advent of computers including a keyboard, processing unit, and monitor, there is often little room on a desk for copy holders of the type available in the prior art.

Also, such copy holders are normally limited to one area on a desk which can be inconvenient for a left or right handed person depending on the computer arrangement. Other problems which are encountered with prior art copy holders relate to the method of holding the paper which often has a tendency to curl, especially if it has been taken off of a fax machine, printer, or copy machine having a set of rollers which move the paper through these machines.

Other drawbacks of prior art printers include the inability to support the paper at a number of angles selected by the user.

Another drawback is that when the copy holders of the prior art are not in use they still need to be stored, and their size often makes this inconvenient.

SUMMARY OF THE INVENTION

The copy holder of the invention is in the form of a substantially T-shaped copy holder which is slidably inserted into a mounting bracket adhered to a monitor. The T-shaped copy holder is reversible so that the holder can be inserted on the right or left side of a monitor depending on the needs of the user. At the same time, the copy holder can be removed from its mounting bracket and reinstalled whenever desired. This is made possible by means of a support bracket which is mounted at one end of the T-shaped member by means of a hinge. The support bracket permits the copy holder to be swiveled in a 180 degree arc to position the copy holder at a convenient angle. When the copy holder is not needed, it can be folded flat against the monitor.

The top of the T-shaped copy holder is in the form of a horizontal slotted beam member into which the paper copy is inserted and held in place. This arrangement is particularly designed to prevent paper curl which is often a problem with prior art devices.

The horizontal slotted beam member which holds the paper copy is provided with an opening between the ends. A paper support arm attached to a securement member is inserted within the opening by means of sliding. A weighted member in the form of a cylindrical bearing moves up and down within the opening and acts to lock or hold in place paper copy which has been inserted within the horizontal slotted beam member. Lifting the bearing with one finger permits the removal of the paper copy.

The paper support arm comprising the stem of the T-shaped copy member is attached to a securement member by means of a hinge. The securement member is slidably inserted within the opening of the slotted member. The hinge attachment of the paper support arm to the securement member permits the paper copy to be supported at any angle up to a 90 degree adjustment.

The invention will be more readily understood by reference to the attached drawings taken with the description which follows.

DETAILED DESCRIPTION OF THE PREFERRED EMBODIMENTS

Figure 1:
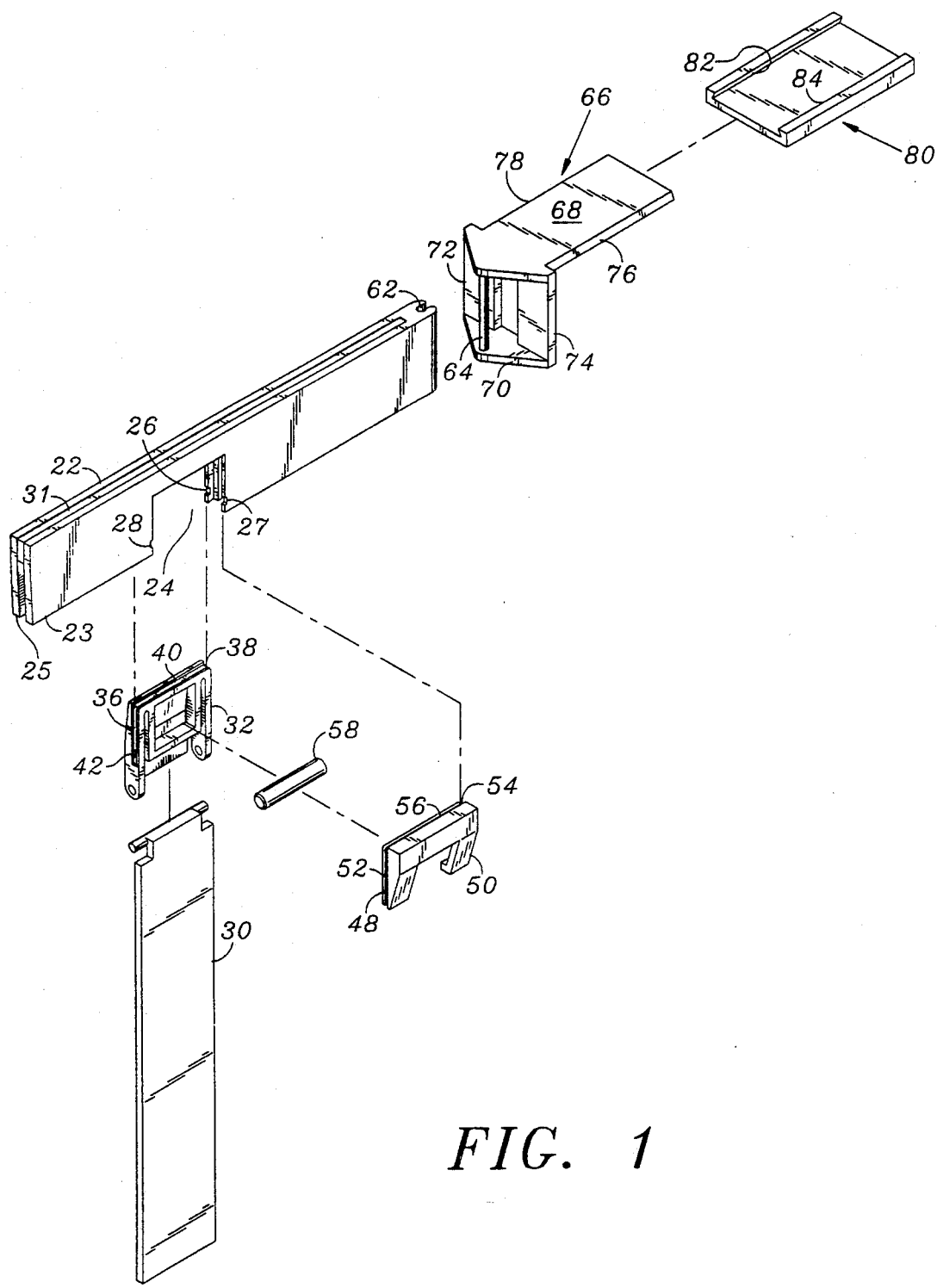
FIG. 1 shows the copy holder of the invention in a perspective view with the various parts disassembled to show the connection of each part.
Figure 2:
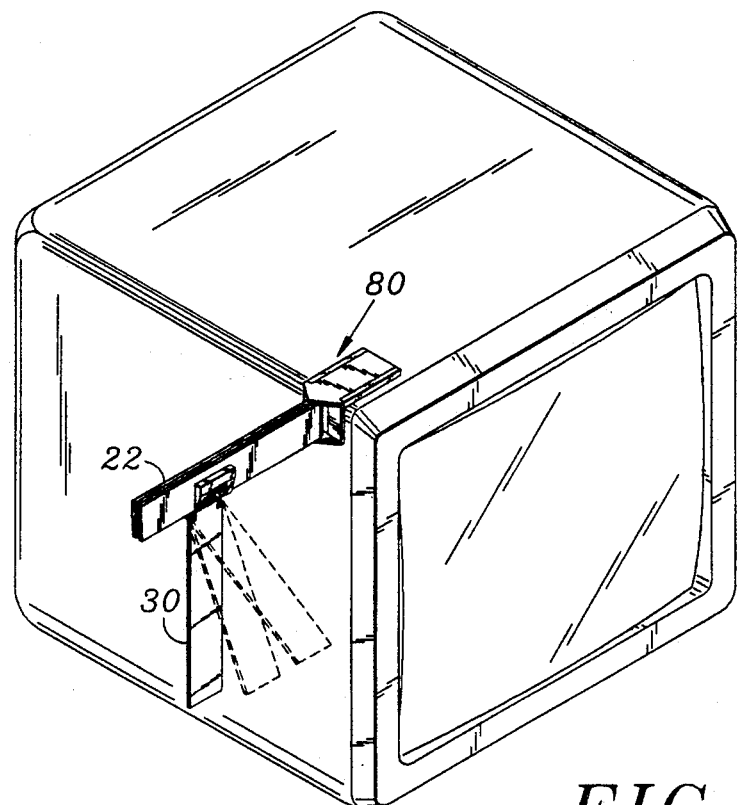
FIG. 2 shows a perspective view of the copy holder of the invention adhered to a monitor.
Figure 3:
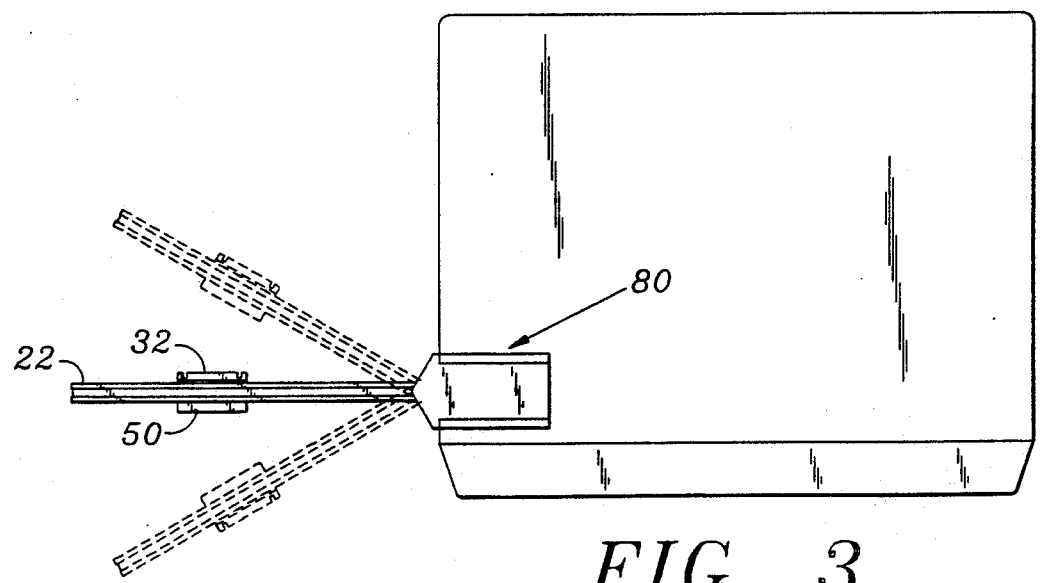
FIG. 3 shows a top plan view of the top of the copy holder of the invention to indicate the capability of pivoting around the support bracket.
Figure 13:
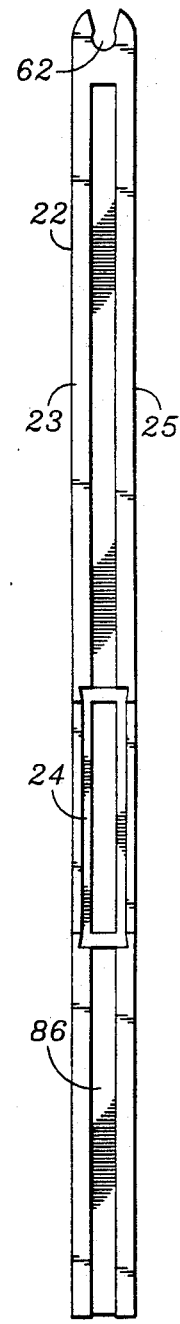
FIG. 13 shows a view from the underside of the slotted beam paper holder.

Looking more particularly at FIGS. 1 and 13 there is shown a paper copy holder consisting mainly of a slotted beam 22 formed of two bar members 23 and 25 joined at the top along one lengthwise side 31. Paper copy is held in the open slot 86 formed between the bars 23 and 25. A substantially rectangular shaped opening 24 is disposed between the ends of beam 22 which extends through bars 23 and 25.

Figure 6:
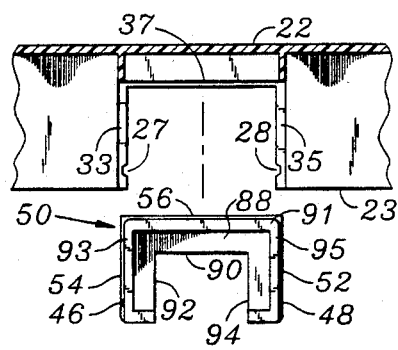
FIG. 6 shows a broken away, detailed, partial section showing a back view of the paper locking means of the copy holder of the invention.
Figure 9:
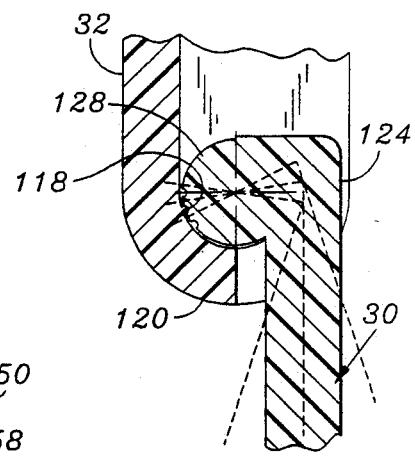
FIG. 9 shows an enlarged cross section taken along the lines 9—9 of FIG. 5 and shows a hinged member.
Figures 7, 8:
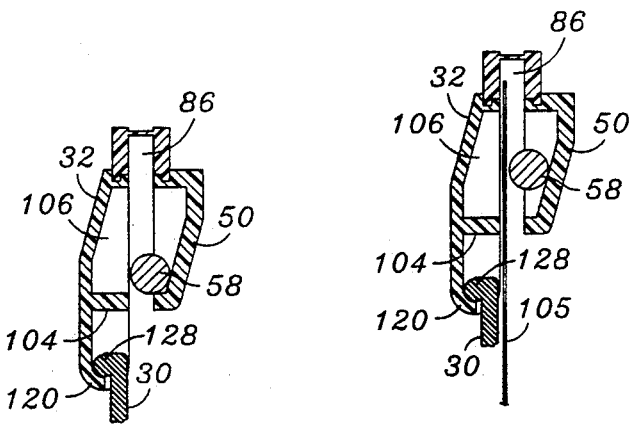
FIG. 7 shows a cross section of the paper locking means taken along the lines 7—7 of FIG. 14.
FIG. 8 shows the same cross section as FIG. 7 with a piece of paper inserted therein.
Figure 10:
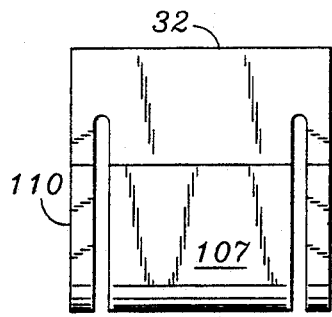
FIG. 10 shows one side of a securement member for the paper support backing.

As shown in FIGS. 6 and 7, the opening 24 is defined by side edges 33 and 35 and top edge 37 of bar 23 and by side edges 39 and 41 and top edge 43 of bar 25. A notch 27 is formed in edge 33 and a notch 28 is formed in edge 35. A notch 26 is formed in side edge 39 and a notch 29 is formed in side edge 41.

Referring now to FIGS. 1, 5, 10, and 11, an elongated paper support member or arm 30 is hinged by means of pin 126 to a securement member or hinge plate 32 by means of openings 114 and 116 to form a hinge. The securement member or hinge plate 32 is provided with side slots 36 and 38 and a top slot 40. The side slots 36 and 38 are each provided with protuberances 42 and 44 respectively.

The securement member 32 is slidably received within opening 24 so that side 41 of opening 24 is received within slot 36 of securement member 32 and notch 29 of opening 24 receives protuberance 42 of member 32. Similarly, side 39 of opening 24 is received within slot 38 of member 32 and notch 26 of opening 24 receives protuberance 44 of member 32. At the same time, top edge 43 of opening 24 is received within top slot 40 of securement member 32.

Similarly as shown in FIG. 6, U-shaped holding member 50 is provided with protuberances 46 and 48 within side channels 54 and 52. U-shaped member 50 also is provided with top channel 56. U-shaped member 50 is slidably received within opening 24 so that side 33 of opening 24 is received in channel 54 of member 50 and side 35 of opening 24 is received in channel 52 of member 50. Protuberance 48 of member 50 engages notch 28 of opening 24 and protuberance 46 of member 50 engages notch 27 of opening 24. Also, top edge 37 of opening 24 is received in top channel 56 of member 50.

Securement member 32 and U-shaped member 50 when inserted within opening 24 in the manner described above together provide an interior channel 88 whereby a bearing 58 is held within the member 32 and U-shaped member 50 in the manner shown in FIG. 7.

A particular feature of the invention permits one sheet or several sheets of paper to be held within open slot 86 of slotted beam 22. The slot 86 can be seen in greater detail in FIG. 13 which shows the slotted beam 22 without any attachments so that the opening 24 can be seen. As shown slot 86 is formed by spaced apart bars 23 and 25 of beam 22.

The paper or papers to be held within the copy holder are secured and held in place within slot 86 of beam 22 by means of a unique paper locking system.

The locking system is made up of U-shaped member 50 and hinged support member 32 which are inserted within opening 24 as above described and together hold bearing 58. These members 50 and 32 can be seen in better detail in FIGS. 5, 6, 7, 8, 10, and 11.

Within the body of U-shaped member 50 is a U-shaped recessed open channel 88. The recessed channel 88 includes a top track 90 and spaced apart side tracks 92 and 94 which are surrounded by adjacent top wall 91, and side walls 93 and 95 respectively. The side walls 93 and 95 are tapered so that the depth is greatest within the channel 88 at the top track 90 and top wall 91. The width between side walls 93 and 95 is adapted to accommodate the length of cylindrical bearing 58. This permits the bearing 58 to move or roll up and down within the recessed open channel 88 along side tracks 92 and 94. The bearing 58 and channel configuration can be of any relationship whereby a weighted member such as a ball or gravitationally oriented rounded object moves down the channel to hold a piece of paper copy.

When hinged support member 32 is inserted within opening 24, it provides a facing surface to channel 88 of member 50 in the form of an upstanding rectangular member 96. The rectangular member 96 includes side walls 98 and 100 which connect top side 102 and bottom side 104. Rectangular member 96 defines an open area 106.

When U-shaped member 50 and support member 32 are inserted within opening 24 of slotted beam 22 in the manner shown in FIGS. 1, 7 and 8, the bearing 58 rolls against rectangular member 96 and within U-shaped open channel 88 of 50. The bearing 58 does not contact open area 106 but only contacts the projecting side walls 98, 100, 102, and 104 of rectangular member 96 on support member 32 and tracks 90, 92 and 94 on U-shaped member 50.

As shown in FIG. 8 one or more papers 105 are easily accommodated within the copy holder by insertion within open slot 86 of slotted beam 22. As shown in FIG. 8, the bearing 58 falls by gravity to contact the paper 105 on one side which is then braced on the other side against the rectangular member 96 by contact with side walls 98, 100, 102, and 104 of rectangular member 96. This locking means effectively holds the paper or papers 105 in place while the copy holder is in use. The bearing 58 can be substituted by any gravitationally oriented weighted member or bearing means.

When it is desired to remove the paper or papers 105 from the copy holder it can be accomplished with one finger by lifting the bearing 58 by insertion of the finger within the U-shaped member 50 and pulling the bearing 58 upwardly slightly. This releases the pressure of the bearing 58 against the papers 105 allowing them to be removed from the open slot 86 of slotted beam 22.

It is another particular feature of the invention that the copy holder is usable for left or right side use. This is accomplished by the manner of insertion of the U-shaped member 50 and the hinge support member 32 within opening 24. Since both sides of the opening 24 are identical, it is a simple matter to insert the U-shaped member 50 and the hinged support member 32 on exactly opposite sides of the slotted beam 22 to change the copy holder from a left to a right hand copy holder. In this instance, the mounting bracket 80 would be adhered to the right hand side of the monitor or other object instead of the left side.

Another feature of the invention is the capability of adjustment of the paper support back 30 through an arc of 90 degrees. As seen particularly in FIGS. 1, 2, 9, 11, and 12, the support member 32 and paper support back 30 are hinged to each other.

Figure 11:
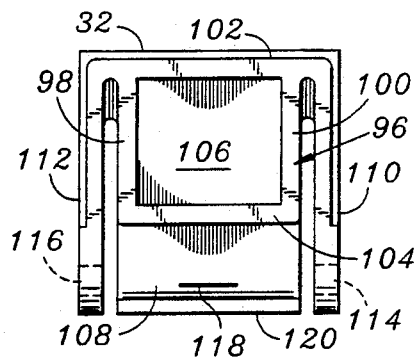
FIG. 11 shows the opposite side of the securement member of FIG. 10.
Figure 14:
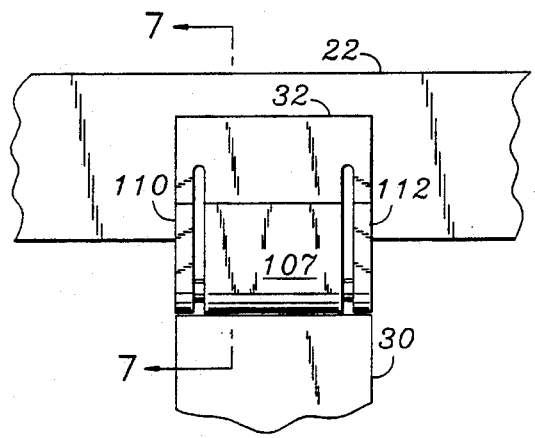
FIG. 14 shows a partially broken away, side view of the slotted beam with the paper backing member and hinged securement member attached thereto.
Figure 12:
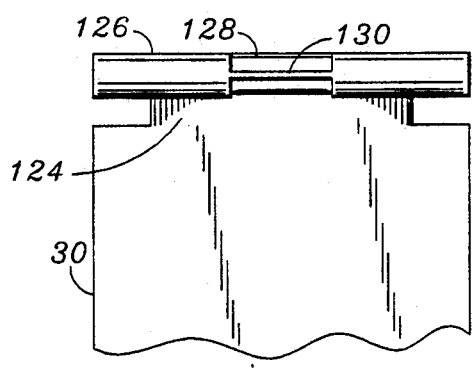
FIG. 12 shows the paper support backing arm.

As shown in FIG. 11, support member 32 includes a tongue extension 108 which extends from exterior facing wall 107 and rectangular member 96. Spaced from exterior facing wall 107 with tongue 108 are flexible arms 110 and 112. Arm 110 is provided with opening 114 and arm 112 is provided with opening 116.

The arms 110 and 112 are joined to support member 32 at one end of exterior facing wall 107 and the remaining ends are free. This permits some flexibility to the arms. Furthermore, the tongue 108 is provided with a raised ridge 118 and an upwardly curving lip 120.

Referring now to FIGS. 1, 9, 12, and 14, paper support backing member 30 is comprised of an elongated, flat, narrow, slat 122. One end of the slat 122 is provided with an extension 124 to which is mounted pin 126. The pin 126 is provided with a substantially centrally located area of decreased diameter 128 within which is provided a plurality of lengthwise ridges 130.

The pin 126 of slat 122 is inserted within openings 114 and 116 of arms 110 and 112 of support member 32. This is made possible in a snap fit manner due to the flexibility of arms 110 and 112. The pin 126 upon insertion within openings 114 and 116 rests upon lip 120 of tongue 108 on support member 32. This can be seen in some detail in the cross section of FIG. 9. The hinge thus formed can move from a vertical condition and be raised up to 90 degrees forwardly to give a forward adjustment to the paper 105 being held. This is made possible by means of the ridge 118 on tongue 108.

The paper backing member 30 is held in the desired forward position by means of the lengthwise ridges 130 which engage raised ridge 118 on tongue 108. At the same time, the forwardly extending lip 120 prevents the paper backing member 30 from extending backwardly substantially beyond the vertical position.

As shown in FIGS. 1 and 13, the slotted beam paper holder 22 is provided with a crosswise groove 62 at one end. Groove 62 snap fits over pin 64 of support bracket 66.

Support bracket 66 is formed of two spaced apart plates 68 and 70 which are joined by pin 64 and support walls 72 and 74. Top plate 68 is formed with two lengthwise beveled edges 76 and 78.

Figure 4:
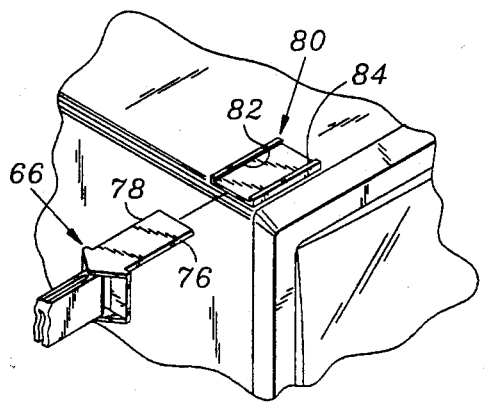
FIG. 4 shows a partially broken away, perspective view of the support bracket removed from the mounting bracket of the copy holder of the invention.
Figure 5:
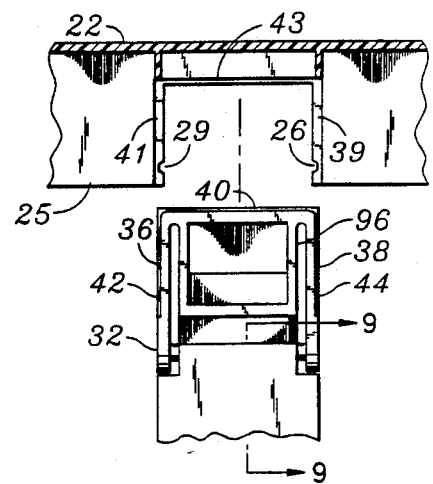
FIG. 5 shows an enlarged, detailed, broken away, partial section of the paper locking means of the copy holder of the invention.

It can be seen in FIG. 4 that the beveled edges 76 and 78 of support bracket 66 slide into and are held by mounting bracket 80 which can be adhered to a monitor or other object. The beveled edges 76 and 78 of top plate 68 of support bracket 66 are received by corresponding angled side edges 82 and 84 of mounting bracket 80.

Since the support bracket 66 is slidably received into mounting bracket 80, the copy holder can be easily removed from the mounting bracket 80 when not needed.

Another advantage of the invention is that the cross groove or slot 62 of slotted beam 22 which is snap-fit around pin 64 of support bracket 66 permits the copy holder to be pivoted through an angle of 180 degrees. The advantage is that the copy holder can be adjusted forwardly for convenience to the user and when not in use can be folded back against the side of the monitor.

It is preferred that each of the separable parts which make up the copy holder preferably be made of plastic. Most preferably the parts are each injection molded from a single piece of plastic. As an alternative, the copy holder can also be made up of other materials such as aluminum or other metals or from wood or other materials. The advantages of having plastic are that it is inexpensive, lightweight, does not require surface treatment such as painting, and is strong.

Various modifications of the invention described above are contemplated and can be resorted to without departing from the spirit and scope of the invention. Thus, this invention should be read broadly in light of the following claims.

We claim:

1. A copy holder comprising:
 a beam having a slot sized to accommodate paper copy;
 locking means on said beam for securing and releasing paper copy within said slot comprising a weighted member disposed at least partially within said slot so that paper copy can be secured by weighted pressure of said weighted member against paper copy placed within said slot and released by lessening said weighted pressure of said weighted member against paper copy held within said slot;
 securing means on said beam for securing said beam to an object; and,
 paper back support means pivotally attached to said beam for providing support to the back of paper copy held within said copy holder.

2. A copy holder according to claim 1 wherein said paper back support means is comprised of a flat narrow member.

3. A copy holder according to claim 1 wherein said copy holder further comprises means for releasably fixing said paper back support means in variable positions with respect to said beam and said pivotal attachment.

4. A copy holder according to claim 1 wherein said means on said beam for securing said beam to an object comprises a support bracket for said beam and a mounting bracket for attachment to said object whereby said support bracket and beam can be attached to said mounting bracket.

5. A copy holder according to claim 1 wherein said weighted member is a cylindrical bearing.

6. A copy holder according to claim 1 wherein:
 said beam has a flat, substantially rectangular configuration with two ends;
 and wherein said locking means further comprises:
 an opening disposed between the ends of said beam in communication with said lengthwise slot; and
 holding means disposed within said opening for holding said cylindrical bearing.

7. A copy holder according to claim 6 wherein said paper back support member is attached to said holding means.

8. A copy holder comprising
 a cantilever beam having two ends;
 support means attached to one of said ends for cantilever support of said beam;
 a slot disposed at least partially within said beam which is adapted to accommodate paper copy;
 a channel associated with said slot for holding a weighted member so that paper copy can be secured by weighted pressure of said weighted member against paper copy placed within said slot and released by lessening said weighted pressure of said weighted member against paper copy held within said slot; and,
 a paper back support means which is hingedly connected to said beam.

9. A copy holder according to claim 8 wherein said support member for said beam is pivotally connected to said beam to permit pivotal movement of said beam with respect to said support member; and
 wherein said weighted member is comprised of a substantially cylindrical bearing.

10. A copy holder according to claim 8 which is made of plastic.

* * * * *